Aug. 27, 1929.   R. B. GRAY   1,725,860
WINDSHIELD WIPER
Filed Jan. 30, 1928
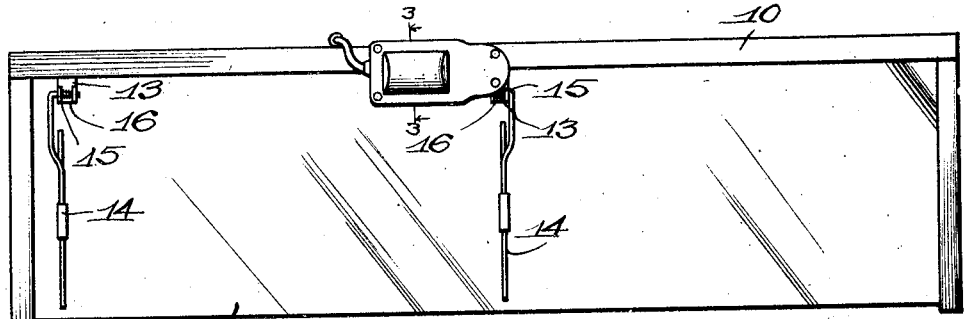
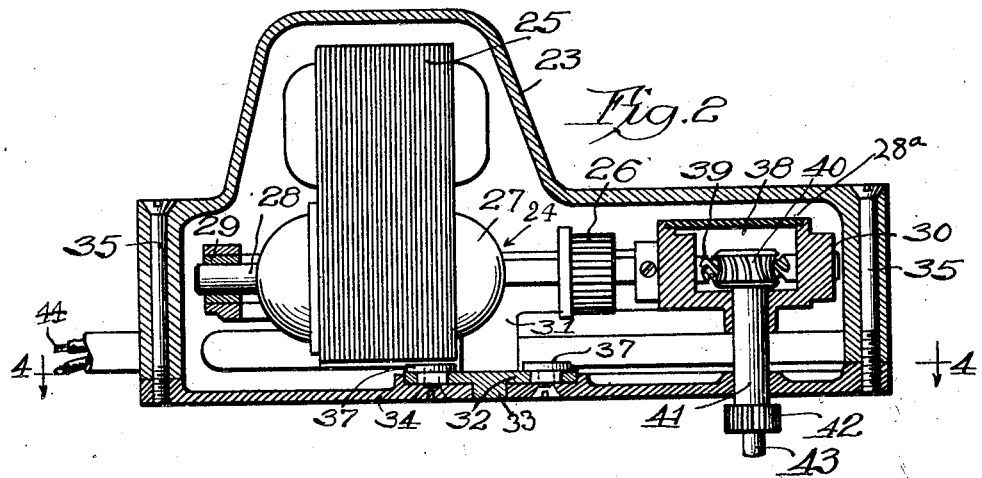
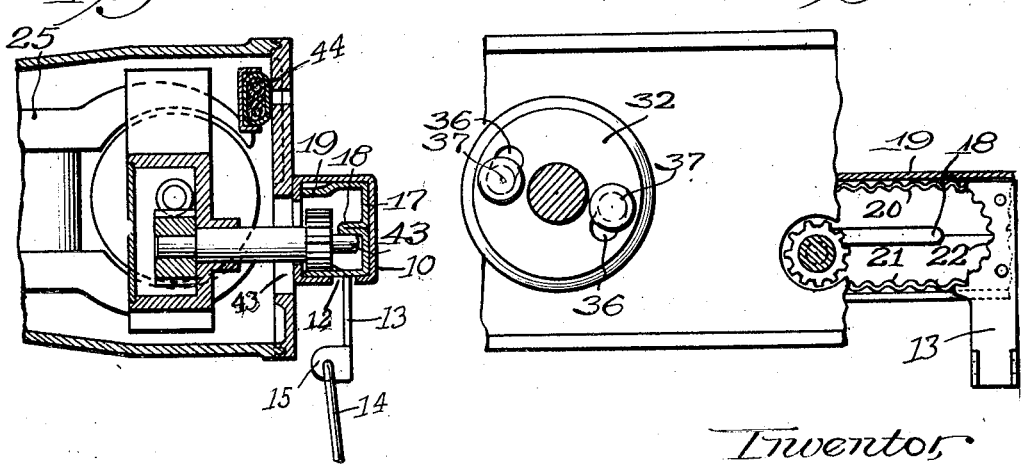
Inventor
RALPH B. GRAY
By M. F. Cargill Atty.
Witness:
Chas. R. Koursh Patented Aug. 27, 1929.

1,725,860

UNITED STATES PATENT OFFICE.

RALPH B. GRAY, OF CHICAGO, ILLINOIS.

WINDSHIELD WIPER.

Application filed January 30, 1928. Serial No. 250,431.

This invention relates to improvements in wind shield wipers.

The principal object of the invention is to provide an automatic wiper of improved construction of the type adapted to operate across the entire, or substantially the entire width of the wind shield to which it is attached.

A more specific object of the invention relates to the improvement of the slide member to which the squeegees or wiper elements are attached and by means of which the same are reciprocated in contact with the wind shield during the operation of the device.

Other objects of the invention relates to various features of construction and arrangement of parts which will become apparent from a consideration of the following specification and accompanying drawings, wherein Figure 1 is an elevation of a conventional wind shield illustrating an embodiment of the present improvements positioned on the front thereof.

Fig. 2 is a horizontal sectional view through the casing of an electric motor which constitutes the power element for operating the wiping mechanism.

Fig. 3 is a sectional view taken on line 3—3 of Fig. 1 and showing in transverse section the carrier casing, the carrier therein and other details.

Fig. 4 is a vertical section taken on line 4—4 of Fig. 2.

In the drawings 10 indicates the main casing which is secured by any suitable means to the forward side of the wind shield 11 adjacent the upper edge thereof. The casing 10 is shown in cross section in Fig. 3 and is preferably formed of sheet metal, the longitudinal edges of which are spaced apart along the lower side to form the slot 12 through which the wiper arms 13, 13 extend and by which wipers are reciprocated in contact with the wind shield. The wipers or squeegees 14 are secured to the ears 15 of the arms and are pressed by means of the coiled springs 16 against the wind shield 11.

The arms 13 are secured to a carrier or slide member 17 by any suitable means. The slide is approximately one half the length of the casing 10 and the arms are attached to the slide adjacent the ends thereof. It will be seen that as the slide reciprocates in the casing 10, the wipers will clean a horizontal path the entire, or substantially the entire width of the wind shield.

The carrier 17 is preferably formed of sheet metal having the shape in cross section shown in Figure 3. The metal is folded along its median line to form a guide rib 18. The free edges of the slide and the ends are provided with teeth 19 which may be formed by crimping the metal of the slide along the edges thereof. This arrangement provides upper and lower rack bars 20 and 21, respectively, which are connected by the curved or arcuately disposed toothed sections or racks 22 at each end of the carrier 17, thus providing in effect a continuous rack by means of which the carrier or slide can be reciprocated. The guide rib 18 terminates short of the arcuate rack sections 22 for purposes hereinafter described.

The guide 18 may, if desired be of other construction although I prefer that shown herein because of economy in manufacture.

The slide 17 is actuated by a suitable power element such as an electric motor, as shown in the drawings. The motor casing 23 is secured to the casing 10 by any suitable means, such as screws (not shown), and houses the electric motor 24. The motor shown may be of conventional design in so far as the laminated structure 25, the commutator 26, and rotor 27 are concerned. The motor is provided with a shaft 28 having a bearing 29 at one end, and is journalled at the other end at 30. The motor structure is supported in the bearings which are carried by the support 31 which has a circular flange 32 provided with a central stud 33. The stud 33 extends into a circular recess in the base plate 34 of the motor casing, the plate being secured to the casing by screws 35, as shown. The flange 32 has arcuate slots 36 through which pass the headed screws or studs 37 which hold the stud 32 in the recess and at the same time permit the motor support 31 to move pivotally on the stud within its relatively stationary casing 23.

The right hand end of the support 31 is shaped to provide a box 38 which houses the worm 39, said worm being an extension of the motor shaft 28. A cover 28ª is provided to close the housing to prevent the escape of lubricant and to exclude foreign matter. The worm 39 meshes with a worm gear 40 on the short shaft 41 which passes through an opening in the base 34 and is provided with a pinion 42 adjacent the other end thereof. The opening 43 in the base is shaped to permit the shaft 41 to partake of the movement of the motor support when the latter is moved pivotally on the stud 32.

When the device is in assembled relation (see Fig. 3), the pinion 42 is in mesh with the teeth of the slide 17, a short hub-like extension 43 bearing against the upper or lower surface of the guide 18 to prevent disengagement of the pinion and the teeth as will be clear.

Electric current may be supplied to the motor from the vehicle battery, or other source, by means of conductors 44. As the motor shaft 28 rotates, the worm 39 will drive the gear 40, shaft 41 and pinion 42 which will cause the slide 17 to move longitudinally within the casing 10. When one end or the other of the slide reaches the pinion 42, the latter will travel on the curved toothed portion 22, thus tilting the motor support and moving the slide in the opposite direction when in engagement with the other rack. As viewed in Figure 4, the pinion 42 is in mesh with the rack 21 and the slide is assumed to be moving to the left. As the curved rack 22 comes into mesh with the pinion, the hub will clear the end of the guide 18, and the pinion will climb the teeth (thus tilting the motor on the stud 32) and then mesh with the teeth of the upper rack 20 and move the slide to the right. When the slide has reached its limit of travel in the latter direction, the pinion will again cause the slide to move to the left as will be clear.

It will be seen that I have provided a reciprocating wind shield cleaner which is actuated by a uni-direction motor which is given a pivotal movement by the driving pinion as the latter cooperates with the slide in effecting the reversal of movement of the cleaning elements.

Although I have shown certain features of my improvements for the purpose of illustration it will be apparent that various changes may be made therein without departing from the spirit thereof, and I do not wish to be restricted to the specific disclosures made herein except where limitations thereto appear in the appended claims.

What I claim is:

1. Apparatus of the class described comprising a casing adapted to be secured adjacent a wind shield, a motor casing secured to said first casing, a motor in said motor casing and being pivoted thereto, a shaft driven by said motor and extending into said first casing, a pinion on said shaft, a slide in said first casing guided by opposite walls thereof in a single path, said slide having upper and lower toothed racks adapted for engagement with said pinion whereby said slide is reciprocated, curved tooth sections connecting the adjacent ends of said racks for moving said pinion about the pivot of the motor from one rack to the other at the end of each stroke of the slide, and means comprising a longitudinal guide member carried by said slide for holding said pinion in mesh with said racks alternately during the reciprocation of said slide, said slide being provided with a wiper adapted to bear against the wind shield.

2. In combination, a casing adapted to be secured adjacent a wind shield, a motor actuated pinion therein, a slide in said casing having upper and lower toothed racks arranged for alternate engagement with said pinion whereby said slide is reciprocated, said slide being guided by said casing in a single horizontal path, a wiper carried by said slide, and means for retaining said pinion in mesh with one or the other of said racks, said means comprising an elongated guide member carried by the slide and spaced equally from the racks.

3. In combination, a casing adapted to be secured adjacent a wind shield, a motor actuated pinion therein, a slide in said casing having upper and lower toothed racks arranged for alternate engagement with said pinion whereby said slide is reciprocated, a wiper carried by said slide, and means for retaining said pinion in mesh with one or the other of said racks, said means comprising an elongated guide member carried by said slide and spaced equally from said racks, said guide comprising a double flange formed integrally with said slide by folding the material of the latter upon itself along its longitudinal center line.

4. In combination, a casing adapted to be secured adjacent a wind shield, a motor actuated pinion therein, a sheet metal slide in said casing having upper and lower toothed racks arranged for alternate engagement with said pinion whereby said slide is reciprocated, said slide being guided by said casing in a single horizontal path, a wiper carried by said slide, and means for retaining said pinion in mesh with one or the other of said racks, said means comprising an elongated guide member integral with said slide and formed as an inwardly directed flange thereof and a cooperating hub coaxial with said pinion.

5. Apparatus as claimed in claim 2 in which the slide member is formed of sheet metal and is of substantially U shape in cross-section and the rack teeth are formed by crimping or corrugating the edges thereof.

6. Apparatus of the class described comprising a casing adapted to be secured adjacent a wind shield, a reciprocatable slide member therein provided with one or more wiper carrying arms, said slide being guided by said casing in a single horizontal path, said slide being provided with an elongated endless toothed rack, a drive pinion in mesh with said rack for reciprocating the slide, and a guiding flange on said slide for holding the pinion in continuous meshing relation with said rack.

In witness whereof I have subscribed my name.

RALPH B. GRAY.